US007013277B2

(12) United States Patent

Minamino et al.

(10) Patent No.: US 7,013,277 B2

(45) Date of Patent: Mar. 14, 2006

(54) SPEECH RECOGNITION APPARATUS, SPEECH RECOGNITION METHOD, AND STORAGE MEDIUM

(75) Inventors: Katsuki Minamino, Tokyo (JP); Yasuharu Asano, Kanagawa (JP); Hiroaki Ogawa, Chiba (JP); Helmut Lucke, Tokyo (JP)

(73) Assignee: Sony Corporation, Tokyo (JP)

( * ) Notice: Subject to any disclaimer, the term of this patent is extended or adjusted under 35 U.S.C. 154(b) by 600 days.

(21) Appl. No.: 09/794,887

(22) Filed: Feb. 26, 2001

(65) Prior Publication Data

US 2001/0020226 A1 Sep. 6, 2001

(30) Foreign Application Priority Data

Feb. 28, 2000 (JP) ............................ 2000-051463

(51) Int. Cl.
*G10L 15/00* (2006.01)

(52) U.S. Cl. ...................................... 704/257; 704/251

(58) Field of Classification Search ................ 704/207, 704/211, 222, 231, 246, 251, 255, 257

See application file for complete search history.

(56) References Cited

U.S. PATENT DOCUMENTS

| | | | | |
|---|---|---|---|---|
| 4,718,094 | A * | 1/1988 | Bahl et al. | 704/256 |
| 4,827,521 | A * | 5/1989 | Bahl et al. | 704/256 |
| 5,029,085 | A * | 7/1991 | Ito | 704/9 |
| 5,241,619 | A * | 8/1993 | Schwartz et al. | 704/200 |
| 5,416,892 | A * | 5/1995 | Loken-Kim | 706/46 |
| 5,870,706 | A * | 2/1999 | Alshawi | 704/255 |
| 5,875,425 | A * | 2/1999 | Nakamura et al. | 704/231 |
| 5,917,944 | A * | 6/1999 | Wakisaka et al. | 382/190 |
| 6,018,708 | A * | 1/2000 | Dahan et al. | 704/244 |
| 6,393,398 | B1 * | 5/2002 | Imai et al. | 704/254 |

FOREIGN PATENT DOCUMENTS

| | | |
|---|---|---|
| EP | 0 677 835 | 10/1995 |

OTHER PUBLICATIONS

Sumio Ohno et al: "A scheme for word detection in continuous speech using likelihood scores of segments modified by their context within a word" IEICE Transactions on Information and Systems, Jun. 1995, Japan, vol. E78-D, No. 6, pp. 725-731, XP000997030 ISSN: 0916-8532, no day.

(Continued)

*Primary Examiner*—Daniel Abebe

(74) *Attorney, Agent, or Firm*—Frommer Lawrence & Haug LLP; William S. Frommer; Darren M. Simon

(57) ABSTRACT

A preliminary word-selecting section selects one or more words following words which have been obtained in a word string serving as a candidate for a result of speech recognition; and a matching section calculates acoustic or linguistic scores for the selected words, and forms a word string serving as a candidate for a result of speech recognition according to the scores. A control section generates word-connection relationships between words in the word string serving as a candidate for a result of speech recognition, sends them to a word-connection-information storage section, and stores them in it. A re-evaluation section corrects the word-connection relationships stored in the word-connection-information storage section 16, and the control section determines a word string serving as the result of speech recognition according to the corrected word-connection relationships.

7 Claims, 8 Drawing Sheets

OTHER PUBLICATIONS

Bahl L R et al: “A Fast Approximate Acoustic Match for Large Vocabulary Speech Recognition” IEEE Transactions on Speech and Audio Processing, IEEE Inc. New York, US, vol. 1, No. 1, 1993, pp. 59-67, XP000358440 ISSN: 1063-6676, no mon/day.

* cited by examiner

SPEECH RECOGNITION APPARATUS, SPEECH RECOGNITION METHOD, AND STORAGE MEDIUM

BACKGROUND OF THE INVENTION

1. Field of the Invention

The present invention relates to speech recognition apparatuses, speech recognition methods, and recording media, and more particularly, to a speech recognition apparatus, a speech recognition method, and a recording medium which allow the precision of speech recognition to be improved.

2. Description of the Related Art

FIG. 1 shows an example structure of a conventional speech recognition apparatus.

Speech uttered by the user is input to a microphone 1, and the microphone 1 converts the input speech to an audio signal, which is an electric signal. The audio signal is sent to an analog-to-digital (AD) conversion section 2. The AD conversion section 2 samples, quantizes, and converts the audio signal, which is an analog signal sent from the microphone 1, into audio data which is a digital signal. The audio data is sent to a feature extracting section 3.

The feature extracting section 3 applies acoustic processing to the audio data sent from the AD conversion section 2 in units of an appropriate number of frames to extract a feature amount, such as a Mel frequency cepstrum coefficient (MFCC), and sends it to a matching section 4. The feature extracting section 3 can extract other feature amounts, such as spectra, linear prediction coefficients, cepstrum coefficients, and line spectrum pairs.

The matching section 4 uses the feature amount sent from the feature extracting section 3 and refers to an acoustic-model data base 5, a dictionary data base 6, and a grammar data base 7, if necessary, to apply speech recognition, for example, by a continuous-distribution HMM method to the speech (input speech) input to the microphone 1.

More specifically, the acoustic-model data base 5 stores acoustic models indicating acoustic features of each phoneme and each syllable in a linguistic aspect of the speech to which speech recognition is applied. Since speech recognition is applied according to the continuos-distribution hidden-Markov-model (HMM) method, HMM is, for example, used as an acoustic model. The dictionary data base 6 stores a word dictionary in which information (phoneme information) related to the pronunciation of each word (vocabulary) to be recognized is described. The grammar data base 7 stores a grammar rule (language model) which describes how each word input into the word dictionary of the dictionary data base 6 is chained (connected). For example, the grammar rule may be a context free grammar (CFG) or a rule based on statistical word chain probabilities (N-gram).

The matching section 4 connects acoustic models stored in the acoustic-model data base 5 by referring to the word dictionary of the dictionary data base 6 to constitute word acoustic models (word models). The matching section 4 further connects several word models by referring to the grammar rule stored in the grammar data base 6, and uses the connected word models to recognize the speech input to the microphone 1, by the continuous-distribution HMM method according to feature amounts. In other words, the matching section 4 detects a series of word models having the highest score (likelihood) in observing time-sequential feature amounts output from the feature extracting section 3, and outputs the word string corresponding to the series of word models as the result of speech recognition.

In other words, the matching section 4 accumulates the probability of occurrence of each feature amount for word strings corresponding to connected word models, uses an accumulated value as a score, and outputs the word string having the highest score as the result of speech recognition.

A score is generally obtained by the total evaluation of an acoustic score (hereinafter called acoustics score, if necessary) given by acoustic models stored in the acoustic-model data base 5 and a linguistic score (hereinafter called language score, if necessary) given by the grammar rule stored in the grammar data base 7.

More specifically, the acoustics score is calculated, for example, by the HMM method, for each word from acoustic models constituting a word model according to the probability (probability of occurrence) by which a series of feature amounts output from the feature extracting section 3 is observed. The language score is obtained, for example, by bigram, according to the probability of chaining (linking) between an aimed-at word and a word disposed immediately before the aimed-at word. The result of speech recognition is determined according to the final score (hereinafter called final score, if necessary) obtained from a total evaluation of the acoustics score and the language score for each word.

Specifically, the final score S of a word string formed of N words is, for example, calculated by the following expression, where wk indicates the k-th word in the word string, A(wk) indicates the acoustics score of the word wk, and L(wk) indicates the language score of the word.

$$S=((A(wk)+Ck\times L(wk)) \quad (1)$$

(indicates a summation obtained when k is changed from 1 to N. Ck indicates a weight applied to the language score L(wk) of the word wk.

The matching section 4 performs, for example, matching processing for obtaining N which makes the final score represented by the expression (1) highest and a word string w1, w2, . . . , and wN, and outputs the word string w1, w2, . . . , and wN as the result of speech recognition.

With the above-described processing, when the user utters "New York ni ikitai desu," the speech recognition apparatus shown in FIG. 1 calculates an acoustics score and a language score for each word, "New York," "ni," "ikitai," or "desu." When their final score obtained from a total evaluation is the highest, the word string, "New York," "ni," "ikitai," and "desu," is output as the result of speech recognition.

In the above case, when five words, "New York," "ni," "ikitai," and "desu," are stored in the word dictionary of the dictionary data base 6, there are 55 kinds of five-word arrangement which can be formed of these five words. Therefore, it can be said in a simple way that the matching section 4 evaluates 55 word strings and determines the most appropriate word string (word string having the highest final score) for the user's utterance among them. If the number of words stored in the word dictionary increases, the number of word strings formed of the words is the number of words multiplied by itself the-number-of-words times. Consequently, a huge number of word strings should be evaluated.

In addition, since the number of words included in utterance is generally unknown, not only word strings formed of five words but word strings formed of one word, two words, and . . . should be evaluated. Therefore, the number of word strings to be evaluated becomes more huge. It is very important to efficiently determine the most likely word string among a huge number of word strings as the result of speech recognition in terms of the amount of calculation and a memory capacity to be used.

To make an efficient use of the amount of calculation and the memory capacity to be used, some measures are taken such as an acoustic branch-cutting technique for stopping score calculation when an acoustics score obtained during a process for obtaining an acoustics score becomes equal to or less than a predetermined threshold, or a linguistic branch-cutting technique for reducing the number of words for which score calculation is performed, according to language scores.

According to these branch-cutting techniques, since words for which score calculation is performed is reduced according to a predetermined determination reference (such as an acoustics score obtained during calculation, described above, and a language score given to a word), the amount of calculation is reduced. If many words are reduced, namely, if a severe determination reference is used, however, even a word which is to be correctly obtained as a result of speech recognition is also removed, and erroneous recognition occurs. Therefore, in the branch-cutting techniques, word reduction needs to be performed with a margin provided to some extent so as not to remove a word which is to be correctly obtained as a result of speech recognition. Consequently, it is difficult to largely reduce the amount of calculation.

When acoustics scores are obtained independently for all words for which score calculation is to be performed, the amount of calculation is large. Therefore, a method has been proposed for making a common use of (sharing) a part of acoustics-score calculation for a plurality of words. In this sharing method, a common acoustic model is applied to words stored in the word dictionary, having the same first phoneme, from the first phoneme to the same last phoneme, and acoustic models are independently applied to the subsequent phonemes to constitute one tree-structure network as a whole and to obtain acoustics scores. More specifically, for example, the words, "akita" and "akebono," are considered. When it is assumed that the phoneme information of "akita" is "akita" and that of "akebono" is "akebono," the acoustics scores of the words, "akita" and "akebono," are calculated in common for the first to second phonemes "a" and "k." Acoustics scores are independently calculated for the remaining phonemes "i," "t," and "a" of the word "akita" and the remaining phonemes "e," "b," "o," "n," and "o" of the word "akebono."

Therefore, according to this method, the amount of calculation performed for acoustics scores is largely reduced.

In this method, however, when a common part is calculated (acoustics scores are calculated in common), the word for which acoustics scores are being calculated cannot be determined. In other words, in the above example of the words, "akita" and "akebono," when acoustics scores are being calculated for the first and second phonemes "a" and "k," it cannot be determined whether acoustics scores are calculated for the word "akita" or the word "akebono."

In this case, as for "akita," when the calculation of an acoustics score starts for its third phoneme, "i," it can be determined that the word for which the calculation is being performed is "akita." Also as for "akebono," when the calculation of an acoustics score starts for its third phoneme, "e," it can be determined that the word for which the calculation is being performed is "akebono."

Therefore, when a part of acoustics-score calculation is shared, a word for which the calculation is being performed cannot be identified when the acoustics-score calculation starts. As a result, it is difficult to use the above-described linguistic branch-cutting method before the start of acoustics-score calculation. Wasteful calculation may be performed.

In addition, when a part of acoustics-score calculation is shared, the above-described tree-structure network is formed for all words stored in the word dictionary. A large memory capacity is required to hold the network.

To make an efficient use of the amount of calculation and the memory capacity to be used, another technique may be taken in which acoustics scores are calculated not for all words stored in the word dictionary but only for words preliminarily selected. The preliminary selection is performed by using, for example, simple acoustic models or a simple grammar rule which does not have very high precision.

A method for preliminary selection is described, for example, in "A Fast Approximate Acoustic Match for Large Vocabulary Speech Recognition," IEEE Trans. Speech and Audio Proc., vol. 1, pp. 59–67, 1993, written by L. R. Bahl, S. V. De Gennaro, P. S. Gopalakrishnan and R. L. Mercer.

The acoustics score of a word is calculated by using a series of feature amounts of speech. When the starting point or the ending point of a series of a feature amount to be used for calculation is different, an acoustics score to be obtained is also changed. This change affects the final score obtained by the expression (1), in which an acoustics score and a language score are totally evaluated.

The starting point and the ending point of the series of feature amounts corresponding to a word, namely, the boundaries (word boundaries) of words, can be obtained, for example, by a dynamic programming method. A point in the series of a feature amount is set to a candidate for a word boundary, and a score (hereinafter called a word score, if necessary) obtained by totally evaluating an acoustics score and a language score is accumulated for each word in a word string, which serves as a candidate for a result of speech recognition. The candidates for word boundaries which give the highest accumulated values are stored together with the accumulated values.

When the accumulated values of word scores have been obtained, word boundaries which give the highest accumulated values, namely, the highest scores, are also obtained.

The method for obtaining word boundaries in the above way is called Viterbi decoding or one-pass decoding, and its details are described, for example, in "Voice Recognition Using Probability Model," the Journal of the Institute of Electronics, Information and Communication Engineers, pp. 20–26, Jul. 1, 1988, written by Seiichi Nakagawa.

To effectively perform the above-described preliminary selection, it is very important to determine word boundaries, that is, to determine a starting point in a series (feature-amount series) of a feature amount.

Specifically, in a feature-amount series obtained from a speech "kyouwaiitenkidesune" shown in FIG. 2(A), for example, when a correct word boundary is disposed at time t1 between "kyou" and "wa," if time t1−1, which precedes the correct time t1, is selected as a starting point in preliminary selection for the word "wa" following the word "kyou," not only the feature amount of the word "wa" but also the last portion of the feature amount of the word "kyou" affects the preliminary selection. If time t1+1, which follows the correct time t1, is selected as a starting point in preliminary selection for the word "wa," the beginning portion of the feature amount of the word "wa" is not used in the preliminary selection.

In either case, if a starting point is erroneously selected, an adverse effect is given to preliminary selection and then to matching processing performed thereafter.

In FIG. 2 (also in FIG. 5 and FIG. 7, described later), time passes in a direction from the left to the right. The starting time of a speech zone is set to 0, and the ending time is set to time T.

In the dynamic programming method, described above, since final word boundaries cannot be determined until word scores (acoustics scores and language scores) have been calculated to the end of a feature-amount series, that is, to the ending time T of the speech zone in FIG. 2, it is difficult to uniquely determine word boundaries which serve as starting points in preliminary selection when the preliminary selection is performed.

To solve this issue, a technique has been proposed in which candidates for word boundaries are held until word scores have been calculated by using a feature-amount series in a speech zone.

In this technique, when a word score is calculated for the word "kyou" with the starting time 0 of the speech zone being used as a start point, and times t1−1, t1, and t1+1 are obtained as candidates for the ending point of the utterance of the word "kyou," for example, these three times t1−1, t1, and t1+1 are held and preliminary selection for the next word is executed with each of these times being used as a starting point.

In the preliminary selection, it is assumed that, when the time t1−1 is used as a starting point, two words "wa" and "ii" are obtained; when the time t1 is used as a starting point, one word "wa" is obtained; and when the time t1+1 is used as a starting point, two words "wa" and "ii" are obtained. It is also assumed that a word score is calculated for each of these words and results shown in FIG. 2(B) to FIG. 2(G) are obtained.

Specifically, FIG. 2(B) shows that a word score is calculated for the word "wa" with the time t1−1 being used as a starting point and time t2 is obtained as a candidate for an ending point. FIG. 2(C) shows that a word score is calculated for the word "ii" with the time t1−1 being used as a starting point and time t2+1 is obtained as a candidate for an ending point. FIG. 2(D) shows that a word score is calculated for the word "wa" with the time t1 being used as a starting point and time t2+1 is obtained as a candidate for an ending point. FIG. 2(E) shows that a word score is calculated for the word "wa" with the time t1 being used as a starting point and time t2 is obtained as a candidate for an ending point. FIG. 2(F) shows that a word score is calculated for the word "wa" with the time t1+1 being used as a starting point and time t2 is obtained as a candidate for an ending point. FIG. 2(G) shows that a word score is calculated for the word "ii" with the time t1+1 being used as a starting point and time t2+2 is obtained as a candidate for an ending point. In FIG. 2, t1−1<t1<t1+1<t2<t2+1<t2+2.

Among FIG. 2(B) to FIG. 2(G), FIG. 2(B), FIG. 2(E), and FIG. 2(F) show that the same word string, "kyou" and "wa," are obtained as a candidate for a result of speech recognition, and that the ending point of the last word "wa" of the word string is at the time t2. Therefore, it is possible that the most appropriate case is selected among them, for example, according to the accumulated values of the word scores obtained up to the time t2 and the remaining cases are discarded.

At the current point of time, however, a correct case cannot be identified among a case selected from those shown in FIG. 2(B), FIG. 2(E), and FIG. 2(F), plus cases shown in FIG. 2(C), FIG. 2(D), and FIG. 2(G). Therefore, these four cases need to be held. Preliminary selection is again executed for these four cases.

Therefore, in this technique, word scores need to be calculated while many word-boundary candidates are held until word-score calculation using a feature-amount series in a speech zone is finished. It is not preferred in terms of an efficient use of the amount of calculation and the memory capacity.

Also in this case, when truly correct word boundaries are held as candidates for word boundaries, the same correct word boundaries are finally obtained in principle as those obtained in a case in which the above-described dynamic programming technique is used. If a truly correct word boundary is not held as a candidate for a word boundary, a word having the word boundary as its starting point or as its ending point is erroneously recognized, and in addition, due to this erroneous recognition, a word following the word may be erroneously recognized.

In recent years, acoustic models which depend on (consider) contexts have been used. Acoustic models depending on contexts mean acoustic models even for the same syllable (or phoneme) which have been modeled as different models according to a syllable disposed immediately before or immediately after. Therefore, for example, a syllable "a" is modeled by different acoustic models between cases in which a syllable disposed immediately before or immediately after is "ka" and "sa."

Acoustic models depending on contexts are divided into those depending on contexts within words and those depending on contexts which extend over words.

In a case in which acoustic models depending on contexts within words are used, when a word model "kyou" is generated by coupling acoustic models "kyo" and "U," an acoustic model "kyo" depending on the syllable "u" coming immediately thereafter (acoustic model "kyo" with the syllable "u" coming immediately thereafter being considered) is used, or an acoustic model "u" depending on the syllable "kyo" coming immediately therebefore is used.

In a case in which acoustic models depending on contexts which extend over words are used, when a word model "kyou" is generated by coupling acoustic models "kyo" and "u," if the word coming immediately thereafter is "wa," an acoustic model "u" depending on the first syllable "wa" of the word coming immediately thereafter. Acoustic models depending on contexts which extend over words are called cross-word models.

When cross-word models are applied to speech recognition which performs preliminary selection, a relationship with a word disposed immediately before a preliminarily selected word can be taken into account, but a relationship with a word disposed immediately after the preliminarily selected word cannot be considered because the word coming immediately thereafter is not yet determined.

To solve this problem, a method has been developed in which a word which is highly likely to be disposed immediately after a preliminarily selected word is obtained in advance, and a word model is created with the relationship with the obtained word taken into account. More specifically, for example, when words "wa," "ga," and "no" are highly likely to be disposed immediately after the word "kyou," the word model is generated by using acoustic models "u" depending on "wa," "ga," and "no," which correspond to the last syllable of word models for the word "kyou."

Since unnecessary contexts are always taken into account, however, this method is not desirable in terms of an efficient use of the amount of calculation and the memory capacity.

For the same reason, it is difficult to calculate the language score of a preliminarily selected word with the word disposed immediately thereafter being taken into account.

As a speech recognition method in which not only a word preceding an aimed-at word but also a word following the aimed-at word are taken into account, there has been proposed a two-pass decoding method, described, for example, in "The N-Best Algorithm: An Efficient and Exact Procedure for Finding The Most Likely Sentence Hypotheses," Proc. ICASSP, pp. 81–84, 1990, written by R. Schwarts and Y. L. Chow.

FIG. 3 shows an outlined structure of a conventional speech recognition apparatus which executes speech recognition by the two-pass decoding method.

In FIG. 3, a matching section 41 performs, for example, the same matching processing as the matching section 4 shown in FIG. 1, and outputs a word string obtained as the result of the processing. The matching section 41 does not output only one word string serving as the final speech-recognition result among a plurality of word strings obtained as the results of the matching processing, but outputs a plurality of likely word strings as candidates for speech-recognition results.

The outputs of the matching section 41 are sent to a matching section 42. The matching section 42 performs matching processing for re-evaluating the probability of determining each word string among the plurality of word strings output from the matching section 41, as the speech-recognition result. In a word string output from the matching section 41 as a speech-recognition result, since a word has not only a word disposed immediately therebefore but also a word disposed immediately thereafter, the matching section 42 uses cross-word models to obtain a new acoustics score and a new language score with not only the word disposed immediately therebefore but also the word disposed immediately thereafter being taken into account. The matching section 42 determines and outputs a likely word string as the speech-recognition result according to the new acoustics score and language score of each word string among the plurality of word strings output from the matching section 41.

In the two-pass decoding, described above, generally, simple acoustic models, a word dictionary, and a grammar rule which do not have high precision are used in the matching section 41, which performs first matching processing, and acoustic models, a word dictionary, and a grammar rule which have high precision are used in the matching section 42, which performs subsequent matching processing. With this configuration, in the speech recognition apparatus shown in FIG. 3, the amounts of processing performed in the matching sections 41 and 42 are both reduced and a highly precise speech-recognition result is obtained.

FIG. 3 shows a two-pass-decoding speech recognition apparatus, as described above. There has also been proposed a speech-recognition apparatus which performs multi-pass decoding, in which the same matching sections are added after the matching section 42 shown in FIG. 3.

In two-pass decoding and multi-pass decoding, however, until the first matching processing has been finished, the next matching processing cannot be achieved. Therefore, a delay time measured from when a speech is input to when the final speech-recognition result is output becomes long.

To solve this problem, there has been proposed a method in which, when first matching processing has been finished for several words, subsequent matching processing is performed for the several words with cross-word models being used, and this operation is repeated for other words. The method is described, for example, in "Evaluation of a Stack Decoder on a Japanese Newspaper Dictation Task," Onkoron, 1-R-12, pp. 141–142, 1997, written by M. Schuster.

Preliminary selection is generally performed by using simple acoustic models and a grammar rule which do not have high precision. Since preliminary selection is applied to all words stored in the word dictionary, when preliminary selection is performed with highly precise acoustic models and a highly precise grammar rule, a large amount of resources, such as the amount of calculation and a memory capacity, is required to hold a real-time feature. Therefore, with the use of simple acoustic models and a simple grammar rule, preliminary selection is executed at a high speed with relatively smaller resources even for a large vocabulary.

In preliminary selection, however, after matching processing is performed for a word by using a feature-amount series and a likely ending point is obtained, the ending point is set to a starting point and matching processing is again performed by using a feature-amount series from the time corresponding to the starting point. In other words, preliminary selection is performed when boundaries (word boundaries) between words included in a speech continuously uttered have not yet finally determined.

Therefore, if the starting point and the ending point of a feature-amount series used in preliminary selection are shifted from the starting point and the ending point of the corresponding word, preliminary selection is performed by using a feature-amount series including the feature amount of a phoneme included in a word disposed immediately before the corresponding word or a word disposed immediately after the corresponding word, or by using a feature-amount series in which the feature amount of the beginning or last portion of the corresponding word is missing, that is, by using a feature-amount series which is acoustically not stable.

Therefore, in preliminary selection using simple acoustic models, it may happen that a word included in an utterance is not selected. If a correct word is not selected in preliminary selection, since matching processing is not performed for the word, an erroneous speech-recognition result is obtained.

To solve this problem, for preliminary selection, there has been proposed a method for widening an acoustic or linguistic determination reference used for selecting a word to increase the number of selected words, and a method in which highly precise acoustic models and a highly precise grammar rule are used.

When an acoustic or linguistic determination reference used for selecting a word is widened in preliminary selection, however, matching processing is applied to many words which are not likely to be speech-recognition results, and an increasing amount of resources, such as the amount of calculation and a memory capacity, is required for matching processing, which has a heavier load per word than preliminary selection.

When highly precise acoustic models and a highly precise grammar rule are used in preliminary selection, an increasing amount of resources is required for preliminary selection.

SUMMARY OF THE INVENTION

The present invention has been made in consideration of the above conditions. An object of the present invention is to perform highly precise speech recognition while an increase of resources required for processing is suppressed.

The foregoing object is achieved in one aspect of the present invention through the provision of a speech recognition apparatus for calculating a score indicating the likelihood of a result of speech recognition applied to an input speech and for recognizing the speech according to the score, including selecting means for selecting one or more words following words which have been obtained in a word string serving as a candidate for a result of the speech recognition, from a group of words to which speech recognition is applied; forming means for calculating the scores for the words selected by the selecting means, and for forming a word string serving as a candidate for a result of the speech recognition according to the scores; storage means for storing word-connection relationships between words in the word string serving as a candidate for a result of the speech recognition; correction means for correcting the word-connection relationships; and determination means for determining a word string serving as the result of the speech recognition according to the corrected word-connection relationships.

The storage means may store the connection relationships by using a graph structure expressed by a node and an arc.

The storage means may store nodes which can be shared as one node.

The storage means may store the acoustic score and the linguistic score of each word, and the starting time and the ending time of the utterance corresponding to each word, together with the connection relationships between words.

The speech recognition apparatus may be configured such that the forming means forms a word string serving as a candidate for a result of the speech recognition by connecting the words for which the scores are calculated to a word for which a score has been calculated, and the correction means sequentially corrects the connection relationships every time a word is connected by the forming means.

The selecting means or the forming means may perform processing while referring to the connection relationships.

The selecting means, the forming means, or the correction means may calculate an acoustic or linguistic score for a word, and perform processing according to the acoustic or linguistic score.

The selecting means, the forming means, or the correction means may calculate an acoustic or linguistic score for each word independently.

The selecting means, the forming means, or the correction means may calculate an acoustic or linguistic score for each word independently in terms of time.

The correction means may calculate an acoustic or linguistic score for a word by referring to the connection relationships with a word disposed before or after the word for which a score is to be calculated being taken into account.

The foregoing object is achieved in another aspect of the present invention through the provision of a speech recognition method for calculating a score indicating the likelihood of a result of speech recognition applied to an input speech and for recognizing the speech according to the score, including a selecting step of selecting one or more words following words which have been obtained in a word string serving as a candidate for a result of the speech recognition, from a group of words to which speech recognition is applied; a forming step of calculating the scores for the words selected in the selecting step, and of forming a word string serving as a candidate for a result of the speech recognition according to the scores; a correction step of correcting word-connection relationships between words in the word string serving as a candidate for a result of the speech recognition, the word-connection relationships being stored in storage means; and a determination step of determining a word string serving as the result of the speech recognition according to the corrected word-connection relationships.

The foregoing object is achieved in still another aspect of the present invention through the provision of a recording medium storing a program which makes a computer execute speech-recognition processing for calculating a score indicating the likelihood of a result of speech recognition applied to an input speech and for recognizing the speech according to the score, the program including a selecting step of selecting one or more words following words which have been obtained in a word string serving as a candidate for a result of the speech recognition, from a group of words to which speech recognition is applied; a forming step of calculating the scores for the words selected in the selecting step, and of forming a word string serving as a candidate for a result of the speech recognition according to the scores; a correction step of correcting word-connection relationships between words in the word string serving as a candidate for a result of the speech recognition, the word-connection relationships being stored in storage means; and a determination step of determining a word string serving as the result of the speech recognition according to the corrected word-connection relationships.

DESCRIPTION OF THE PREFERRED EMBODIMENTS

Figure 1:
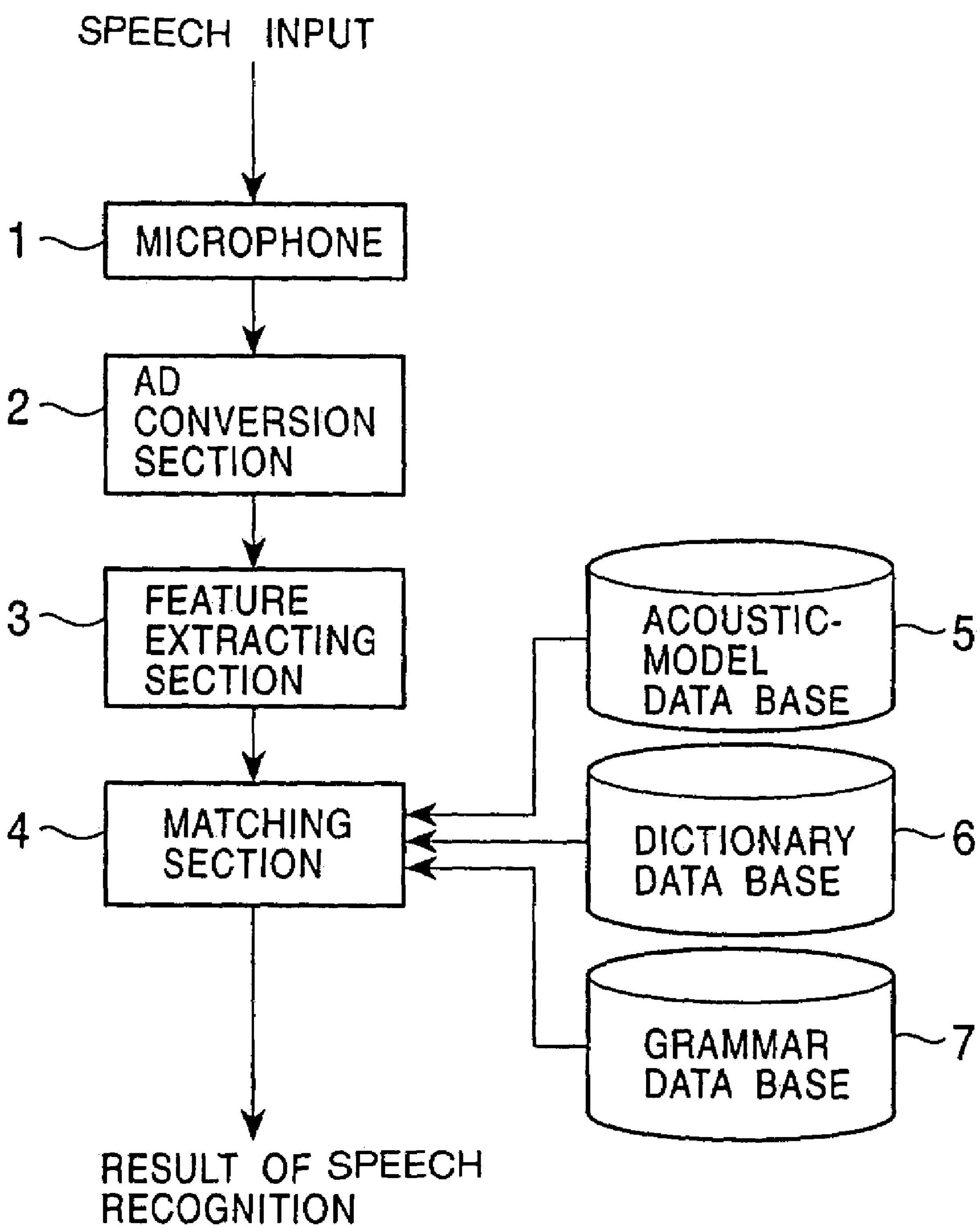
FIG. 1 is a block diagram of a conventional speech recognition apparatus.
Figure 4:
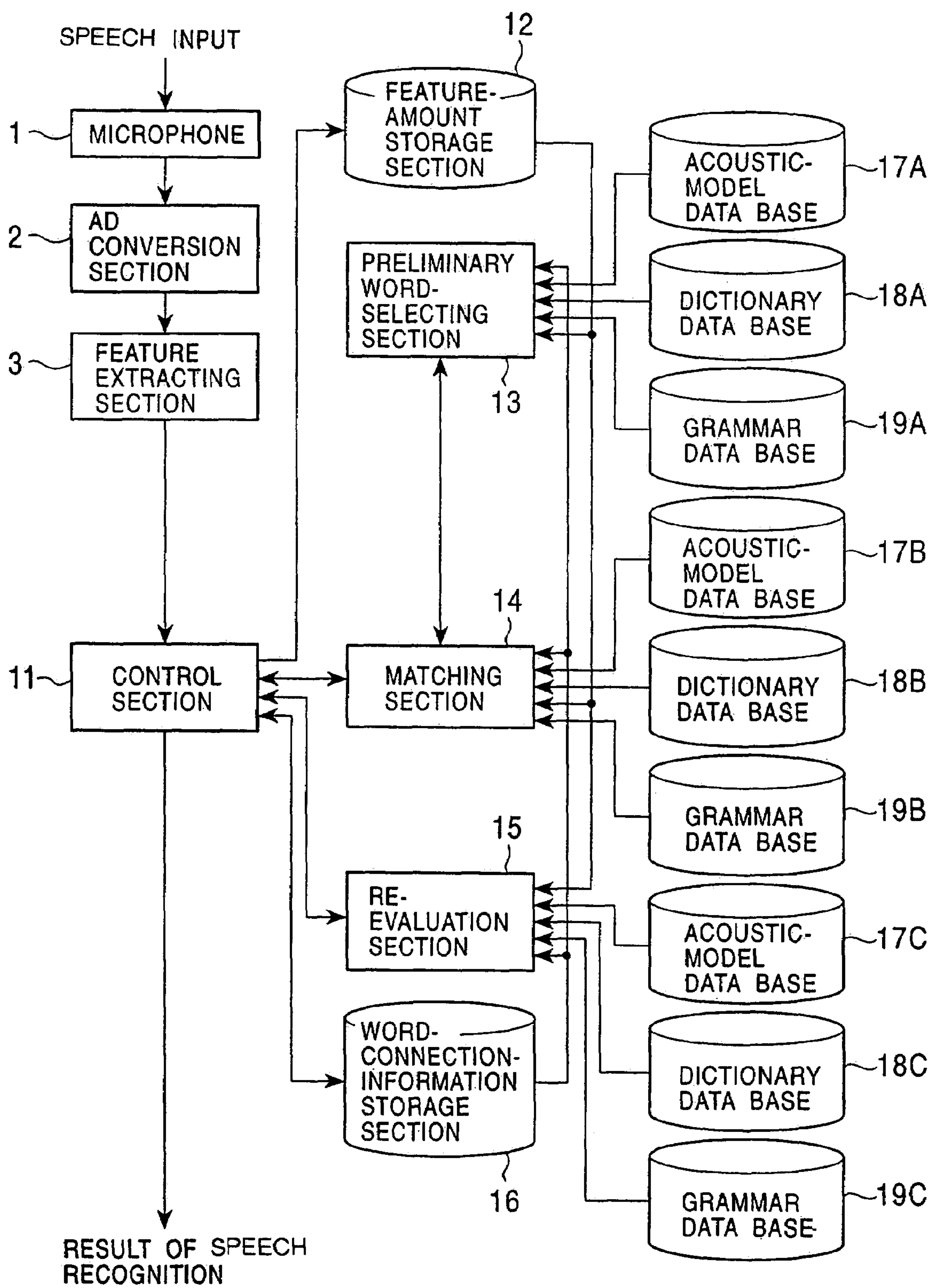
FIG. 4 is a block diagram of a speech recognition apparatus according to an embodiment of the present invention.

FIG. 4 shows an example structure of a speech recognition apparatus according to an embodiment of the present invention. In FIG. 4, the same symbols as those used in FIG. 1 are assigned to the portions corresponding to those shown in FIG. 1, and a description thereof will be omitted.

Series of feature amounts of the speech uttered by the user, output from a feature extracting section 3 are sent to a control section 11 in units of frames. The control section 11 sends the feature amounts sent from the feature extracting section 3, to a feature-amount storage section 12.

The control section 11 controls a matching section 14 and a re-evaluation section 15 by referring to word-connection information stored in a word-connection-information storage section 16. The control section 11 also generates word-connection information according to acoustics scores and language scores obtained in the matching section 14 as the results of the same matching processing as that performed in the matching section 4 shown in FIG. 1, and, by that word-connection information, updates the storage contents of the word-connection information storage section 16. The control section 11 further corrects the storage contents of the word-connection-information storage section 16 according to the output of the re-evaluation section 15. In addition, the control section 11 determines and outputs the final result of speech recognition according to the word-connection information stored in the word-connection-information storage section 16.

The feature-amount storage section 12 stores series of feature amounts sent from the control section 11 until, for example, the result of user's speech recognition is obtained. The control section 11 sends a time (hereinafter called an extracting time, if necessary) when a feature amount output from the feature extracting section 3 is obtained with the starting time of a speech zone being set to a reference (for example, zero), to the feature-amount storage section 12 together with the feature amount. The feature-amount storage section 12 stores the feature amount together with the extracting time. The feature amount and the extracting time stored in the feature-amount storage section 12 can be referred to, if necessary, by a preliminary word-selecting section 13, the matching section 14, and the re-evaluation section 15.

In response to a request from the matching section 14, the preliminary word-selecting section 13 performs preliminary word-selecting processing for selecting one or more words to which the matching section 14 applies matching processing, with the use of the feature amounts stored in the feature-amount storage section 12 by referring to the word-connection-information storage section 16, an acoustic-model data base 17A, a dictionary data base 18A, and a grammar data base 19A, if necessary.

Under the control of the control section 11, the matching section 14 applies matching processing to the words obtained by the preliminary word-selecting processing in the preliminary word-selecting section 13, with the use of the feature amounts stored in the feature-amount storage section 12 by referring to the word-connection-information storage section 16, an acoustic-model data base 17B, a dictionary data base 18B, and a grammar data base 19B, if necessary, and sends the result of matching processing to the control section 11.

Under the control of the control section 11, the re-evaluation section 15 re-evaluates the word-connection information stored in the word-connection-information storage section 16, with the use of the feature amounts stored in the feature-amount storage section 12 by referring to an acoustic-model data base 17C, a dictionary data base 18C, and a grammar data base 19C, if necessary, and sends the result of re-evaluation to the control section 11.

The word-connection-information storage section 16 stores the word-connection information sent from the control section 11 until the result of user's speech recognition is obtained.

The word-connection information indicates connection (chaining or linking) relationships between words which constitute word strings serving as candidates for the final result of speech recognition, and includes the acoustics score and the language score of each word and the starting time and the ending time of the utterance corresponding to each word.

Figure 5:
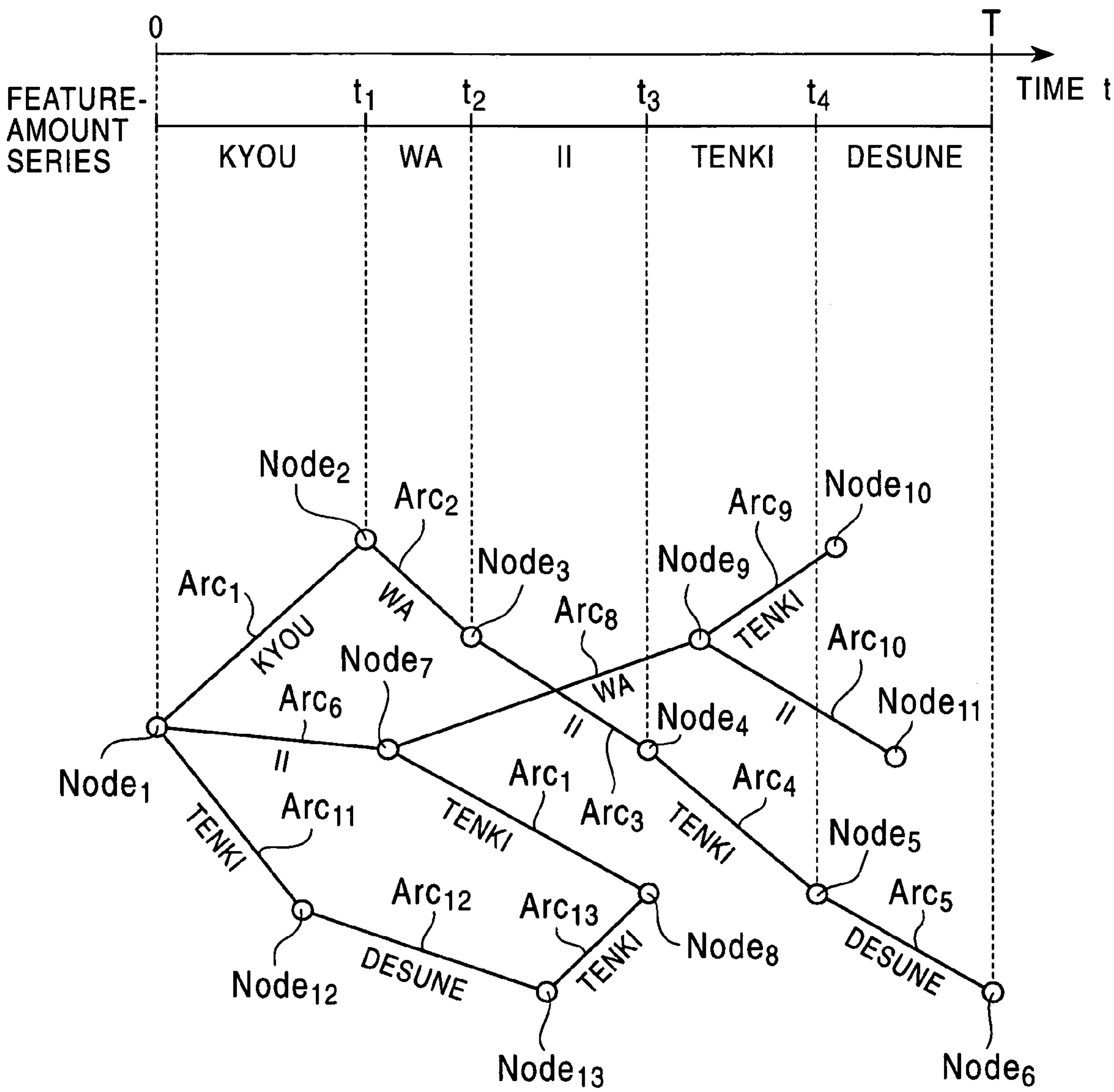
FIG. 5 is a view showing word-connection information.

FIG. 5 shows the word-connection information stored in the word-connection-information storage section 16 by using a graph structure.

In the embodiment shown in FIG. 5, the graph structure indicating the word-connection information is formed of arcs (portions indicated by segments connecting marks! in FIG. 5) indicating words and nodes (portions indicated by marks ! in FIG. 5) indicating boundaries between words.

Nodes have time information which indicates the extracting time of the feature amounts corresponding to the nodes. As described above, an extracting time shows a time when a feature amount output from the feature extracting section 3 is obtained with the starting time of a speech zone being set to zero. Therefore, in FIG. 5, the start of a speech zone, namely, the time information which the node Node1 corresponding to the beginning of a first word has is zero. Nodes can be the starting ends and the ending ends of arcs. The time information which nodes (starting-end nodes) serving as starting ends have or the time information which nodes (ending-end nodes) serving as ending ends have are the starting time or the ending time of the utterances of the words corresponding to the nodes, respectively.

In FIG. 5, time passes in the direction from the left to the right. Therefore, between nodes disposed at the left and right of an arc, the left-hand node serves as the starting-end node and the right-hand node serves as the ending-end node.

Arcs have the acoustics scores and the language scores of the words corresponding to the arcs. Arcs are sequentially connected by setting an ending node to a starting node to form a series of words serving as a candidate for the result of speech recognition.

More specifically, the control section 11 first connects the arcs corresponding to words which are likely to serve as the results of speech recognition to the node Node1 indicating the start of a speech zone. In the embodiment shown in FIG. 5, an arc Arc1 corresponding to "kyou," an arc Arc6 corresponding to "ii," and an arc Arc11 corresponding to "tenki" are connected to the node Node1. It is determined according to acoustics scores and language scores obtained by the matching section 14 whether words are likely to serve as the results of speech recognition.

Then, in the same way, the arcs corresponding to likely words are connected to a node Node2 serving as the ending end of the arc Arc1 corresponding to "kyo," to an ending node Node7 serving as the ending end of the arc Arc6 corresponding to "ii," and to a node Node12 serving as the ending end of the arc Arc11 corresponding to "tenki."

Arcs are connected as described above to form one or more passes formed of arcs and nodes in the direction from the left to the right with the start of the speech zone being used as a starting point. When all passes reach the end (time T in the embodiment shown in FIG. 5) of the speech zone, for example, the control section 11 accumulates the acoustics scores and the language scores which arcs constituting each pass formed from the start to the end of the speech zone have, to obtain final scores. The series of words corresponding to the arcs constituting the pass which has the highest final score is determined to be the result of speech recognition and output.

Specifically, in FIG. 5, when the highest final score is obtained for a pass formed of the node Node1, the arc Arc1 corresponding to "kyou," the node Node2, the arc Arc2 corresponding to "wa," a node Node3, an arc Arc3 corresponding to "ii," a node Node4, an arc Arc4 corresponding to "tenki," a node Node5, an arc Arc5 corresponding to "desune," and a node Node6, for example, a series of words, "kyou," "wa," "ii," "tenki," and "desune," is output as the result of speech recognition.

In the above case, arcs are always connected to nodes disposed within the speech zone to form a pass extending from the start to the end of the speech zone. During a process for forming such a pass, it is possible that, when it is clear from a score for a pass which has been made so far that the pass is inappropriate as the result of speech recognition, forming the pass is stopped (an arc is not connected any more).

According to the above pass forming rule, the ending end of one arc serves as the starting-end nodes of one or more arcs to be connected next, and passes are basically formed as branches and leaves spread. There is an exceptional case in which the ending end of one arc matches the ending end of another arc, namely, the ending-end node of an arc and the ending end of another arc are used as an identical node in common.

When bigram is used as a grammar rule, if two arcs extending from different nodes correspond to an identical word, and the same ending time of the utterance of the word is used, the ending ends of the two arcs match.

In FIG. 5, an arc Arc7 extending from a node Node7 used as a starting end and an arc Arc13 extending from a node Node13 used as a starting point both correspond to "tenki," and the same ending time of the utterance is used, the ending nodes thereof are used as an identical node Node8 in common.

It is also possible that nodes are always not used in common. In the viewpoint of the efficient use of a memory capacity, it is preferred that two ending nodes may match.

In FIG. 5, bigram is used as a grammar rule. Even when other rules, such as trigram, are used, it is possible to use nodes in common.

The preliminary word-selecting section 13, the matching section 14, and the re-evaluation section 15 can refer to the word-connection information stored in the word-connection-information storage section 16, if necessary.

Back to FIG. 4, the acoustic-model data bases 17A, 17B, and 17C basically store acoustic models such as those stored in the acoustic-model data base 5 shown in FIG. 1, described before.

The acoustic-model data base 17B stores highly precise acoustic models to which more precise processing can be applied than that applied to acoustic models stored in the acoustic-model data base 17A. The acoustic-model data base 17C stores highly precise acoustic models to which more precise processing can be applied than that applied to the acoustic models stored in the acoustic-model data base 17B. More specifically, when the acoustic-model data base 17A stores, for example, one-pattern acoustic models which do not depend on the context for each phoneme and syllable, the acoustic-model data base 17B stores, for example, acoustic models which depend on the context extending over words, namely cross-word models as well as acoustic models which do not depend on the context for each phoneme and syllable. In this case, the acoustic-model data base 17C stores, for example, acoustic models depending on the context within words in addition to acoustic models which do not depend on the context and cross-word models.

The dictionary data base 18A, 18B, and 18C basically store a word dictionary such as that stored in the dictionary data base 6 shown in FIG. 1, described above.

Specifically, the same set of words is stored in the word dictionaries of the dictionary data bases 18A to 18C. The word dictionary of the dictionary data base 18B stores highly precise phoneme information to which more precise processing can be applied than that applied to phoneme information stored in the word dictionary of the dictionary data base 18A. The word dictionary of the dictionary data base 18C stores highly precise phoneme information to which more precise processing can be applied than that applied to the phoneme information stored in the word dictionary of the dictionary data base 18B. More specifically, when only one piece of phoneme information (reading) is stored for each word in the word dictionary of the dictionary data base 18A, for example, a plurality of pieces of phoneme information is stored for each word in the word dictionary of the dictionary data base 18B. In this case, for example, more pieces of phoneme information is stored for each word in the word dictionary of the dictionary data base 18C.

Concretely, for example, for the word "ohayou," one piece of phoneme information, "ohayou," is stored in the word dictionary of the dictionary data base 18A, "ohayoo" and "ohayo" as well as "ohayou" are stored as phoneme information in the word dictionary of the dictionary data base 18B, and "hayou" and "hayoo" in addition to "ohayou," "ohayoo," and "ohayo" are stored as phoneme information in the word dictionary of the dictionary data base 18C.

The grammar data bases 19A, 19B, and 19C basically store a grammar rule such as that stored in the grammar data base 7 shown in FIG. 1, described above.

The grammar data base 19B stores a highly precise grammar rule to which more precise processing can be applied than that applied to a grammar rule stored in the grammar data base 19A. The grammar data base 19C stores a highly precise grammar rule to which more precise processing can be applied than that applied to the grammar rule stored in the grammar data base 19B. More specifically, when the grammar data base 19A stores, for example, a grammar rule based on unigram (occurrence probabilities of words), the grammar data base 19B stores, for example, bigram (occurrence probabilities of words with a relationship with words disposed immediately therebefore being taken into account). In this case, the grammar data base 19C stores, for example, a grammar rule based on trigram (occurrence probabilities of words with relationships with words disposed immediately therebefore and words disposed one more word before being taken into account) and a context-free grammar.

As described above, the acoustic-model data base 17A stores one-pattern acoustic models for each phoneme and syllable, the acoustic-model data base 17B stores plural-pattern acoustic models for each phoneme and syllable, and the acoustic-model data base 17C stores more-pattern acoustic models for each phoneme and syllable. The dictionary data base 18A stores one piece of phoneme information for each word, the dictionary data base 18B stores a plurality of pieces of phoneme information for each word, and the dictionary data base 18C stores more pieces of phoneme information for each word. The grammar data base 19A stores a simple grammar rule, the grammar data base 19B stores a highly precise grammar rule, and the grammar data base 19C stores a more highly precise grammar rule.

The preliminary word-selecting section 13, which refers to the acoustic-model data base 17A, the dictionary data base 18A, and the grammar data base 19A, obtains acoustics scores and language scores quickly for many words although precision is not high. The matching section 14, which refers to the acoustic-model data base 17B, the dictionary data base 18B, and the grammar data base 19B, obtains acoustics scores and language scores quickly for a certain number of words with high precision. The re-evaluation section 15, which refers to the acoustic-model data base 17C, the dictionary data base 18C, and the grammar data base 19C, obtains acoustics scores and language scores quickly for a few words with higher precision.

The precision of the acoustic models stored in the acoustic-model data bases 17A to 17C are different in the above description. The acoustic-model data bases 17A to 17C can store the same acoustic models. In this case, the acoustic-model data bases 17A to 17C can be integrated into one acoustic-model data base. In the same way, the word dictionaries of the dictionary data bases 18A to 18C can store the same contents, and the grammar data bases 19A to 19C can store the same grammar rule.

Figure 6:
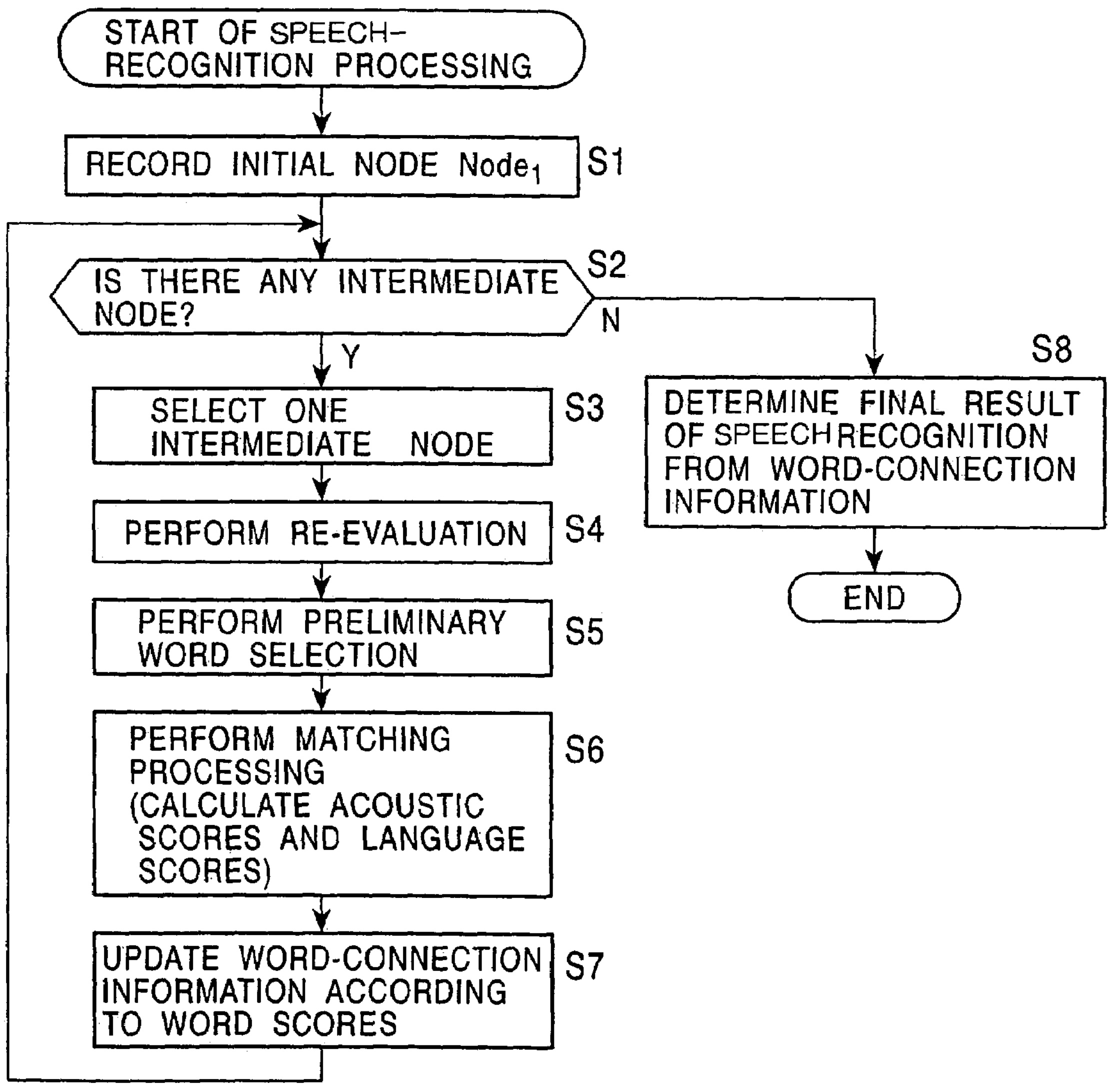
FIG. 6 is a flowchart of processing executed by the speech recognition apparatus shown in FIG. 4.

Speech recognition processing executed by the speech recognition apparatus shown in FIG. 4 will be described next by referring to a flowchart shown in FIG. 6.

When the user utters, the uttered speech is converted to a digital speech data through a microphone 1 and an AD conversion section 2, and is sent to the feature extracting section 3. The feature extracting section 3 sequentially extracts a speech feature amount from the sent speech data in units of frames, and sends it to the control section 11.

The control section 11 recognizes a speech zone by some technique, relates a series of feature amounts sent from the feature extracting section 3 to the extracting time of each feature amount in the speech zone, and sends them to the feature-amount storage section 12 and stores them in it.

After the speech zone starts, the control section 11 also generates a node (hereinafter called an initial node, if necessary) indicating the start of the speech zone, and sends it to the word-connection-information storage section 16 and stores in it in step S1. In other words, the control section 11 stores the node Node1 shown in FIG. 5 in the word-connection-information storage section 16 in step S1.

The processing proceeds to step S2. The control section 11 determines whether an intermediate node exists by referring to the word-connection information stored in the word-connection-information storage section 16.

As described above, in the word-connection information shown in FIG. 5, arcs are connected to ending-end nodes to form a pass which extends from the start of the speech zone to the end. In step S2, among ending-end nodes, a node to which an arc has not yet been connected and which does not reach the end of the speech zone is searched for as an intermediate node (such as the nodes Node8, Node10, and Node11 in FIG. 5), and it is determined whether such an intermediate node exists.

As described above, the speech zone is recognized by some technique, and the time corresponding to an ending-end node is recognized by referring to the time information which the ending-end node has. Therefore, whether an ending-end node to which an arc has not yet been connected does not reach the end of the speech zone is determined by comparing the end time of the speech zone with the time information which the ending-end node has.

When it is determined in step S2 that an intermediate node exists, the processing proceeds to step S3. The control section 11 selects one node from intermediate nodes included in the word-connection information as a node (hereinafter called an aimed-at node, if necessary) for determining a word serving as an arc to be connected to the node.

Specifically, when only one intermediate node is included in the word-connection information, the control section 11 selects the intermediate node as an aimed-at node. When a plurality of intermediate nodes are included in the word-connection information, the control section 11 selects one of the plurality of intermediate nodes as an aimed-at node. More specifically, the control section 11 refers to the time information which each of the plurality of intermediate nodes has, and selects the node having the time information which indicates the oldest time (closest to the start of the speech zone), or the node having the time information which indicates the newest time (closest to the end of the speech zone), as an aimed-at node. Alternatively, for example, the control section 11 accumulates the acoustics scores and the language scores which the arcs constituting a pass extending from the initial node to each the plurality of intermediate nodes have, and selects the intermediate node disposed at the ending end of the pass which has the largest of accumulated values (hereinafter called partial accumulated values, if necessary) or the smallest.

Then, the control section 11 outputs an instruction (hereinafter called a matching processing instruction, if necessary) for performing matching processing with the time information which the aimed-at node has being used as a starting time, to the matching section 14 and to the re-evaluation section 15.

When the re-evaluation section 15 receives the matching processing instruction from the control section 11, the processing proceeds to step S4. The re-evaluation section 15 recognizes the word string (hereinafter called a partial word string) indicated by the arcs constituting the pass (hereinafter called a partial pass) extending from the initial node to the aimed-at node, by referring to the word-connection-information storage section 16 to re-evaluate the partial word string. The partial word string is, as described later, an intermediate result of a word string serving as a candidate for the result of speech recognition, obtained by matching processing which the matching section 14 applies to words preliminarily selected by the preliminary word-selecting section 13. The re-evaluation section 15 again evaluates the intermediate result.

Specifically, the re-evaluation section 15 reads the series of feature amounts corresponding to the partial word string from the feature-amount storage section 12 to re-calculate a language score and an acoustics score for the partial word string. More specifically, the re-evaluation section 15 reads, for example, the series (feature-amount series) of feature amounts related to the period from the time indicated by the time information which the initial node, the beginning node of the partial pass, has to the time indicated by the time information which the aimed-at node has, from the feature-amount storage section 12. In addition, the re-evaluation section 15 re-calculates a language score and an acoustics score for the partial word string by referring to the acoustic-model data base 17C, the dictionary data base 18C, and the grammar data base 19C with the use of the feature-amount series read from the feature-amount storage section 12. This re-calculation is performed without fixing the word boundaries of the words constituting the partial word string. Therefore, the re-evaluation section 15 determines the word boundaries of the words constituting the partial word string according to the dynamic programming method by re-calculating a language score and an acoustics score for the partial word string.

When the re-evaluation section 15 obtains the language score, the acoustics score, and the word boundaries of each word of the partial word string, the re-evaluation section 15 uses the new language scores and acoustics scores to correct the language scores and the acoustics scores which the arcs constituting the partial pass stored in the word-connection-information storage section 16 corresponding to the partial word string have, and also uses the new word boundaries to correct the time information which the nodes constituting the partial pass stored in the word-connection-information storage section 16 corresponding to the partial word string have. In the present embodiment, the re-evaluation section 15 corrects the word-connection information through the control section 11.

Figure 7:
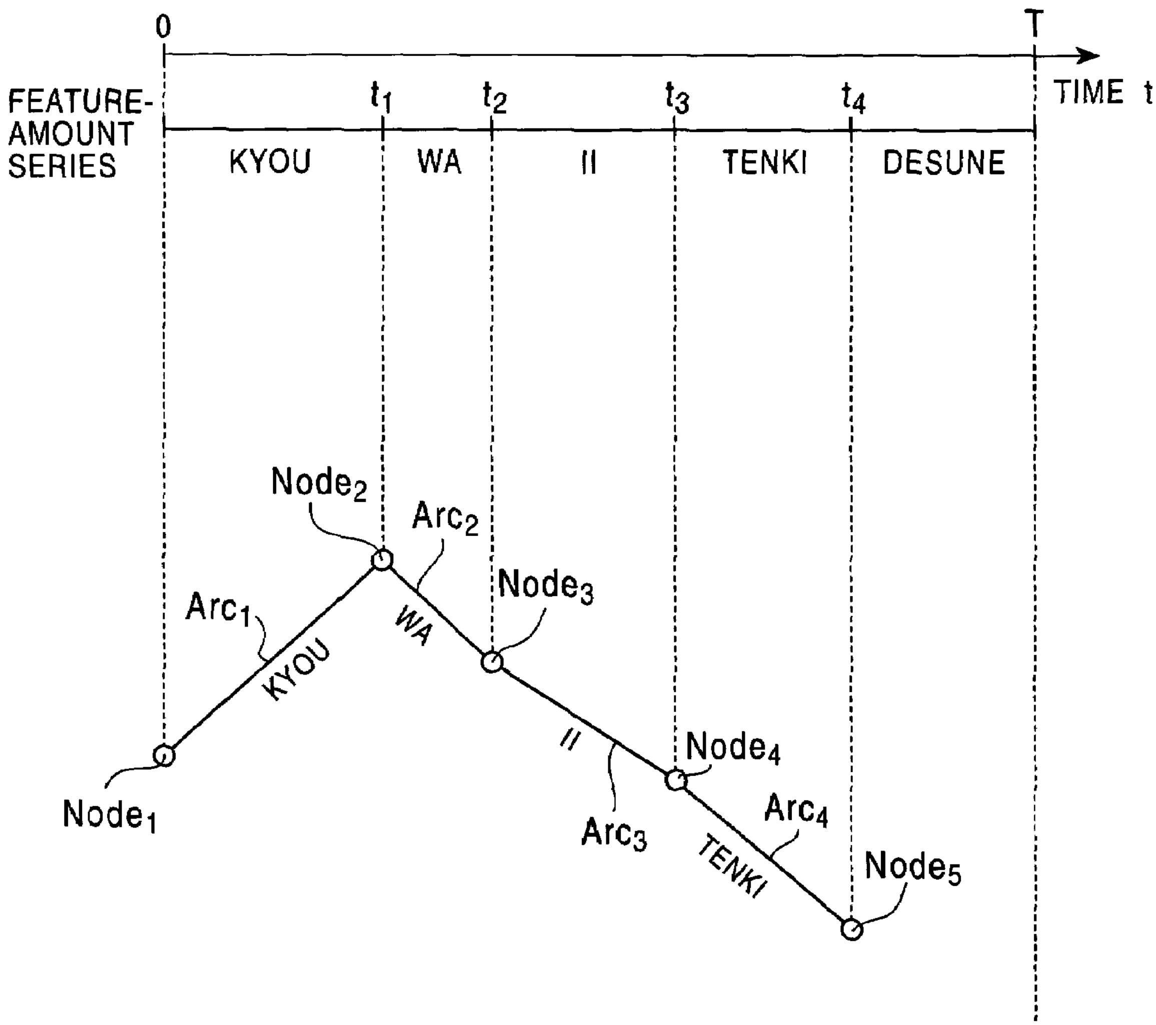
FIG. 7 is a view showing processing executed by a re-evaluation section 15.

When the node Node5 shown in FIG. 7 is set to an aimed-at node, for example, if a word string "ii" and "tenki"

formed of the node Node3, the arc Arc3 corresponding to the word "ii," the node Node4, the arc Arc4 corresponding to the word "tenki," and the node5 is examined within the partial pass extending from the initial node Node1 to the aimed-at node Node5, the re-evaluation section 15 generates word models for the words "ii" and "tenki," and calculates acoustics scores by referring to the acoustic-model data base 17C and the dictionary data base 18C with the use of the feature-amount series from the time corresponding to the node Node3 to the time corresponding to the node Node5. The re-evaluation section 15 also calculates language scores for the words "ii" and "tenki" by referring to the grammar data base 19C. More specifically, when the grammar data base 19C stores a grammar rule based on trigram, for example, the re-evaluation section 15 uses, for the word "ii," the word "wa" disposed immediately therebefore and the word "kyou" disposed one more word before to calculate the probability of a word chain "kyou," "wa," and "ii" in that order, and calculates a language score according to the obtained probability. The re-evaluation section 15 uses, for the word "tenki," the word "ii" disposed immediately therebefore and the word "wa" disposed one more word before to calculate the probability of a word chain "wa," "ii," and "tenki" in that order, and calculates a language score according to the obtained probability.

The re-evaluation section 15 accumulates acoustics scores and language scores obtained as described above, and determines the word boundary between the words "ii" and "tenki" so as to obtain the largest accumulated value. The re-evaluation section 15 uses the obtained acoustics scores and language scores to correct the acoustics scores and the language scores which the arc Arc3 corresponding to the word "ii" has and the arc Arc4 corresponding to the word "tenki" has, and uses the determined word boundary to correct the time information which the node Node4 corresponding to the word boundary between the words "ii" and "tenki" has.

Therefore, the re-evaluation section 15 determines the word boundaries of the words constituting the partial word string by the dynamic programming method, and sequentially corrects the word-connection information stored in the word-connection-information storage section 16. Since the preliminary word-selecting section 13 and the matching section 14 perform processing by referring to the corrected word-connection information, the precision and reliability of the processing are improved.

In addition, since the re-evaluation section 15 corrects word boundaries included in the word-connection information, the number of word-boundary candidates to be stored in the word-connection information can be largely reduced to make an efficient use of the memory capacity.

Figure 2:
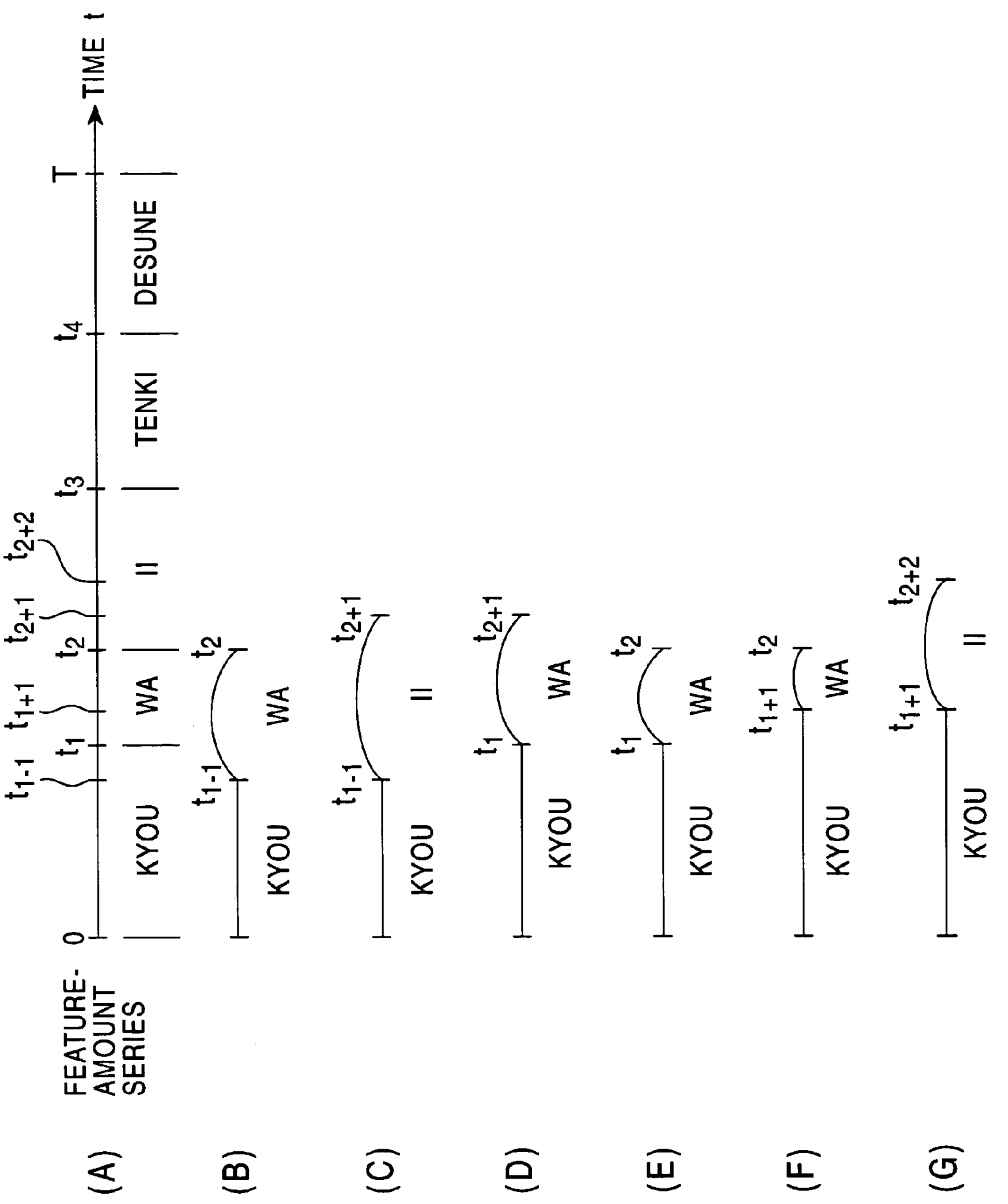
FIG. 2 is a view showing a reason why candidates for boundaries between words need to be held.
Figure 3:
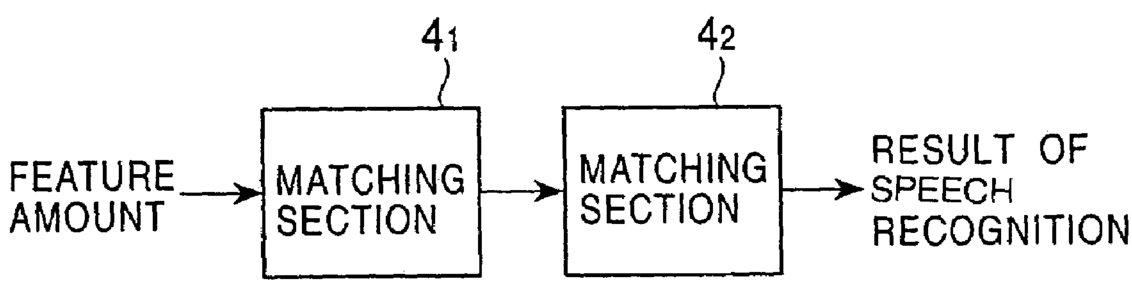
FIG. 3 is a block diagram of another conventional speech recognition apparatus.

In other words, conventionally, three times t1−1, t1, and t1+1 need to be held as word-boundary candidates between the words "kyou" and "wa" as described before by referring to FIG. 2. If the time t1, which is the correct word boundary, is erroneously not held, matching processing thereafter is adversely affected. In contrast, when the re-evaluation section 15 sequentially corrects word boundaries, even if only the time t1−1, which is an erroneous word boundary, is held, for example, the re-evaluation section 15 changes the time t1−1, which is an erroneous word boundary, to the time t1, which is the correct word boundary. Therefore, matching processing thereafter is not adversely affected.

The re-evaluation section 15 uses cross-word models in which words disposed before and after a target word are taken into account, for words constituting the partial word string except the top and end words to calculate acoustics scores. Words disposed before and after a target word can be taken into account also in the calculation of language scores. Therefore, highly precise processing is made possible. Furthermore, since the re-evaluation section sequentially performs processing, a large delay which occurs in two-pass decoding, described before, does not happen.

When the re-evaluation section 15 has corrected the word-connection information stored in the word-connection-information storage section 16 as described above, the re-evaluation section 15 reports the completion of correction to the matching section 14 through the control section 11.

As described above, after the matching section 14 receives the matching processing instruction from the control section 11, when the matching section 14 is reported by the re-evaluation section 15 through the control section 11 that the word-connection information has been corrected, the matching section 14 sends the aimed-at node and the time information which the aimed-at node has to the preliminary word-selecting section 13 and asks to apply preliminary word-selecting processing, and the processing proceeds to step S5.

In step S5, when the preliminary word-selecting section 13 receives the requests for preliminary word-selecting processing from the matching section 14, the preliminary word-selecting section 13 applies preliminary word-selecting processing for selecting a word candidate serving as an arc to be connected to the aimed-at node, to the words stored in the word dictionary of the dictionary data base 18A.

More specifically, the preliminary word-selecting section 13 recognizes the starting time of a series of feature amounts used for calculating a language score and an acoustics score, from the time information which the aimed-at node has, and reads the required series of feature amounts, starting from the starting time, from the feature-amount storage section 12. The preliminary word-selecting section 13 also generates a word model for each word stored in the word dictionary of the dictionary data base 18A by connecting acoustic models stored in the acoustic-model data base 17A, and calculates an acoustics score according to the word model by the use of the series of feature amounts read from the feature-amount storage section 12.

The preliminary word-selecting section 13 calculates the language score of the word corresponding to each word model according to the grammar rule stored in the grammar data base 19A. Specifically, the preliminary word-selecting section 13 obtains the language score of each word according to, for example, unigram.

It is possible that the preliminary word-selecting section 13 uses cross-word models depending on words (words corresponding to arcs having the aimed-at node as ending ends) disposed immediately before target words to calculate the acoustics score of each word by referring to the word-connection information.

It is also possible that the preliminary word-selecting section 13 calculates the language score of each word according to bigram which specifies the probability of chaining the target word and a word disposed therebefore by referring to the word-connection information.

When the preliminary word-selecting section 13 obtains the acoustics score and language score of each word, as described above, the preliminary word-selecting section 13 obtains a score (hereinafter called a word score, if necessary) which is a total evaluation of the acoustics score and the language score, and sends L words having higher word scores to the matching section 14 as words to which matching processing is to be applied.

The preliminary word-selecting section 13 selects a word according to the word score which is a total evaluation of the acoustics score and the language score of each word. It is also possible that the preliminary word-selecting section 13 selects words according to, for example, only acoustics scores or only language scores.

It is also possible that the preliminary word-selecting section 13 uses only the beginning portion of the series of feature amounts read from the feature-amount storage section 12 to obtain several phonemes for the beginning portion of the corresponding word according to the acoustic models stored in the acoustic-model data base 17A, and selects words in which the beginning portions thereof match the obtained phonemes.

It is further possible that the preliminary word-selecting section 13 recognizes the part of speech of the word (word corresponding to the arc having the aimed-at node as an ending-end node) disposed immediately before the target word by referring to the word-connection information, and selects words serving as a part of speech which is likely to follow the recognized part of speech.

The preliminary word-selecting section 13 may use any word-selecting method. Ultimately, words may be selected at random.

When the matching section 14 receives the L words (hereinafter called selected words) used in matching processing from the preliminary word-selecting section 13, the matching section 14 applies matching processing to the selected words in step S6.

Specifically, the matching section 14 recognizes the starting time of a series of feature amounts used for calculating a language score and an acoustics score, from the time information which the aimed-at node has, and reads the required series of feature amounts, starting from the starting time, from the feature-amount storage section 12. The matching section 14 recognizes the phoneme information of the selected words sent from the preliminary word-selecting section 13 by referring to the dictionary data base 18B, reads the acoustic models corresponding to the phoneme information from the acoustic-model data base 17B, and connects the acoustic models to form word models.

The matching section 14 calculates the acoustics scores of the selected words sent from the preliminary word-selecting section 13 by the use of the feature-amount series read from the feature-amount storage section 12, according to the word models formed as described above. It is possible that the matching section 14 calculates the acoustics scores of the selected words by referring to the word-connection information, according to cross-word models.

The matching section 14 also calculates the language scores of the selected words sent from the preliminary word-selecting section 13 by referring to the grammar data base 19B. Specifically, the matching section 14 refers to, for example, the word-connection information to recognize words disposed immediately before the selected words sent from the preliminary word-selecting section 13 and words disposed one more word before, and obtains the language scores of the selected words sent from the preliminary word-selecting section 13 by the use of probabilities based on bigram or trigram.

The matching section 14 obtains the acoustics scores and the language scores of all the L selected words sent from the preliminary word-selecting section 13, as described above, and the processing proceeds to step S7. In step S7, for each selected word, a word score which is a total evaluation of the acoustics score and the language score of the word is obtained, and the word-connection information stored in the word-connection-information storage section 16 is updated according to the obtained word scores.

In other words, in step S7, the matching section 14 obtains the word scores of the selected words, and, for example, compares the word scores with a predetermined threshold to narrow the selected words down to words which can serve as an arc to be connected to the aimed-at node. Then, the matching section 14 sends the words obtained by narrowing down to the control section 11 together with the acoustics scores thereof, the language scores thereof, and the ending times thereof.

The matching section 14 recognizes the ending time of each word from the extracting time of the feature amount used for calculating the acoustics score. When a plurality of extracting times which are highly likely to serve as the ending time of a word are obtained, sets of each ending time, the corresponding acoustics score, and the corresponding language score of the word are sent to the control section 11.

When the control section 11 receives the acoustics score, language score, and ending time of each word from the matching section 14, as described above, the control section uses the aimed-at node in the word-connection information (FIG. 5) stored in the word-connection-information storage section 16 as a starting node, extends an arc, and connect the arc to the ending-end node corresponding to the ending time, for each word. The control section 11 also assigns to each arc the corresponding word, the corresponding acoustics score, and the corresponding language score, and gives the corresponding end time as time information to the ending-end node of each arc. Then, the processing returns to step S2, and the same processes are repeated.

As described above, the word-connection information is sequentially updated according to the results of processing executed in the matching section 14, and further, sequentially updated by the re-evaluation section 15. Therefore, it is made possible that the preliminary word-selecting section 13 and the matching section 14 always use the word-connection information for their processing.

The control section 11 integrates, if possible, two ending-end nodes into one, as described above, when updating the word-connection information.

When it is determined in step S2 that there is no intermediate node, the processing proceeds to step S8. The control section 11 refers to the word-connection information to accumulate word scores for each pass formed in the word-connection information to obtain the final score, outputs, for example, the word string corresponding to the arcs constituting the pass which has the highest final score as the result of speech recognition for the user's utterance, and terminates the processing.

As described above, the preliminary word-selecting section 13 selects one or more words following words which have been obtained in a word string serving as a candidate for a result of speech recognition; the matching section 14 calculates scores for the selected words, and form a word string serving as a candidate for a result of speech recognition according to the scores; the re-evaluation section 15 corrects word-connection relationships between words in the word string serving as a candidate for a result of speech recognition; and the control section 11 determines a word string serving as the result of speech recognition according to the corrected word-connection relationships. Therefore, highly precise speech recognition is performed while an increase of resources required for processing is suppressed.

Since the re-evaluation section 15 corrects word boundaries in the word-connection information, the time information which the aimed-at node has indicates a word boundary highly precisely. The preliminary word-selecting section 13 and the matching section 14 perform processing by the use of a series of feature amounts from the time indicated by the highly precise time information. Therefore, even when a determination reference for selecting words in the preliminary word-selecting section 13 and a determination reference for narrowing the selected words in the matching section 14 are made strict, a possibility of excluding a correct word which serves as a result of speech recognition is made very low.

When the determination reference for selecting words in the preliminary word-selecting section 13 is made strict, the number of words to which the matching section 14 applies matching processing is reduced. As a result, the amount of calculation and the memory capacity required for the processing in the matching section 14 are also reduced.

When the preliminary word-selecting section 13 does not select a word starting from a certain time, which is one of the words constituting the word string serving as the correct result of speech recognition, at that time, if the word is selected at an erroneous time shifted from the certain time, the re-evaluation section 15 corrects the erroneous time, and the word string serving as the correct result of speech recognition is obtained. In other words, even if the preliminary word-selecting section 13 fails to select a word which is one of the words constituting the word string serving as the correct result of speech recognition, the re-evaluation section 15 corrects the failure of selection to obtain the word string serving as the correct result of speech recognition.

Therefore, the re-evaluation section 15 corrects an erroneous word selection executed by the preliminary word-selecting section 13 in addition to an erroneous detection of an end time executed by the matching section 14.

The series of processing described above can be implemented by hardware or software. When the series of processing is achieved by software, a program constituting the software is installed into a general-purpose computer and the like.

Figure 8:
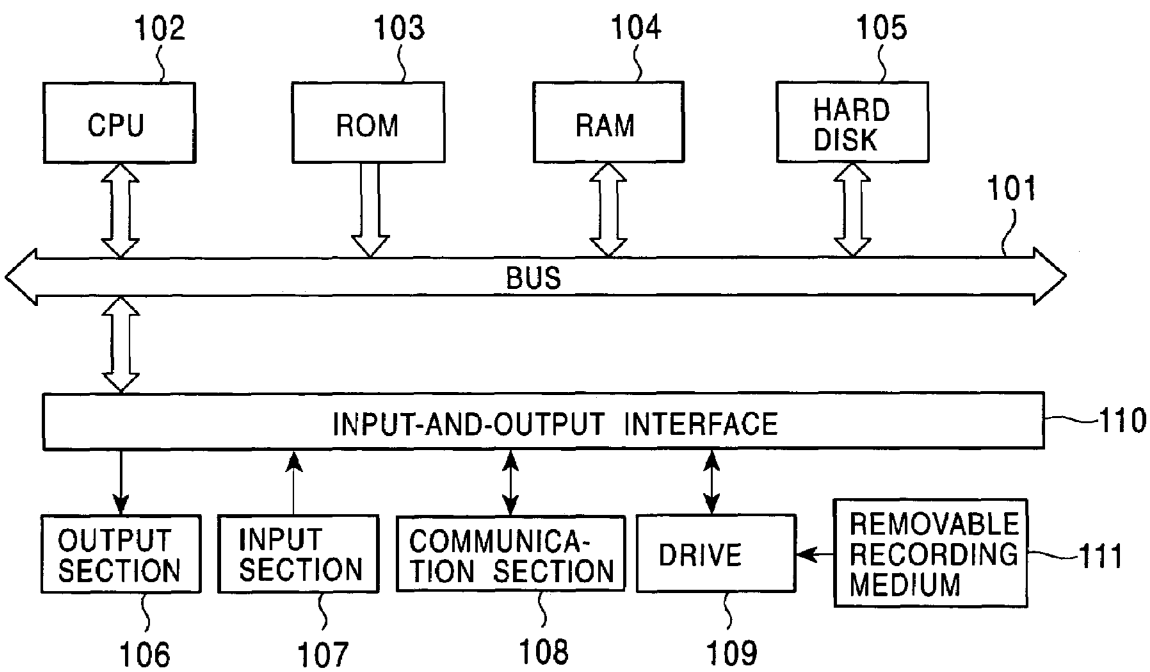
FIG. 8 is a block diagram of a computer according to another embodiment of the present invention.

FIG. 8 shows an example structure of a computer in which a program for executing the series of processing described above is installed, according to an embodiment.

The program can be recorded in advance into a hard disk 105 or a read-only memory (ROM) 103 serving as a recording medium which is built in the computer.

Alternatively, the program is recorded temporarily or perpetually into a removable recording medium 111, such as a floppy disk, a compact disc read-only memory (CD-ROM), a magneto-optical (MO) disk, a digital versatile disk (DVD), a magnetic disk, or a semiconductor memory. Such a removable recording medium 111 can be provided as so-called package software.

The program may be installed from the removable recording medium 111, described above, to the computer. Alternatively, the program is transferred by radio from a downloading site to the computer through an artificial satellite for digital satellite broadcasting, or to the computer by wire through a network such as a local area network (LAN) or the Internet; is received by a communication section 108 of the computer; and is installed into the hard disk 105, built in the computer.

The computer includes a central processing unit (CPU) 102. The CPU 102 is connected to an input and output interface 110 through a bus 101. When the user operates an input section 107 formed of a keyboard, a mouse, and a microphone to input a command through the input and output interface 110, the CPU 102 executes a program stored in the ROM 103 according to the command. Alternatively, the CPU 102 loads into a random access memory (RAM) 104 a program stored in the hard disk 105; a program transferred through a satellite or a network, received by the communication section 108, and installed into the hard disk 105; or a program read from the removable recording medium 111 mounted to a drive 109, and installed into the hard disk 105; and executes it. The CPU executes the processing illustrated in the above flowchart, or processing performed by the structure shown in the above block diagram. Then, the CPU 102 outputs the processing result as required, for example, through the input and output interface 110 from an output section 106 formed of a liquid crystal display (LCD) and a speaker; transmits the processing result from the communication section 108; or records the processing result in the hard disk 105.

In the present specification, the steps describing the program for making the computer execute various types of processing are not necessarily executed in a time-sequential manner in the order described in the flowchart and include processing (such as parallel processing or object-based processing) executed in parallel or separately.

The program may be executed by one computer or may be distribution-processed by a plurality of computers. The program may also be transferred to a remote computer and executed.

Since words for which the matching section 14 calculates scores have been selected in advance by the preliminary word-selecting section 13, the matching section 14 can calculate scores for each word independently without forming a tree-structure network in which a part of acoustics-score calculation is shared, as described above. In this case, the capacity of a memory used by the matching section 14 to calculate scores for each word is suppressed to a low level. In addition, in this case, since each word can be identified when a score calculation is started for the word, a wasteful calculation is prevented which is otherwise performed because the word is not identified. In other words, before an acoustics score is calculated for a word, a language score is calculated and branch cutting is executed according to the language score, so that a wasteful acoustics-score calculation is prevented.

The preliminary word-selecting section 13, the matching section 14, and the re-evaluation section 15 can calculate scores for each word independently in terms of time. In this case, the same memory required for the score calculation can be shared to suppress the required memory capacity to a low level.

The speech recognition apparatus shown in FIG. 4 can be applied to speech interactive systems used in a case in which a data base is searched by speech, in a case in which various types of units are operated by speech, and in a case in which data is input to each unit by speech. More specifically, for example, the speech recognition apparatus can be applied to a data-base searching apparatus for displaying map information in response to an inquiry of the name of a place by speech, an industrial robot for classifying materials in response to an instruction by speech, a dictation system for generating texts in response to a speech input instead of a keyboard input, and an interactive system in a robot for talking with a user.

According to a speech recognition apparatus and a speech recognition method, and a recording medium of the present invention, one or more words are selected from a group of words to which speech recognition is applied, to serve as words following words which have been obtained in a word string serving as a candidate for a result of speech recognition; scores are calculated for the selected words; and a word string serving as a candidate for a result of speech recognition is formed. Connection relationships between words in the word string serving as a candidate for a result of speech recognition are corrected, and a word string serving as the result of speech recognition is determined according to the corrected connection relationships. Therefore, highly precise speech recognition is implemented while an increase of resources required for processing is suppressed.

What is claimed is:

1. A speech recognition apparatus for recognizing an input speech as a recognized speech, comprising:

a feature extracting means for extracting feature amounts from the input speech;

a preliminary word-selecting means for selecting words on the basis of the feature amounts by referring to a first database;

a matching means for calculating acoustic and linguistic scores for the selected words and forming a word string serving as a candidate for the recognized speech by referring to a second database; wherein the second database incorporates more precise acoustic model, phoneme information, and grammar rules than the first database;

a control means for generating word-connection-information between words in the word string; the word-connection-information including acoustic and linguistic scores for each word in the word string;

a re-evaluation means for re-evaluating the word string and correcting the word-connection-information by referring to a third database; wherein the third database incorporates more precise acoustic models, phoneme information, and grammar rules than the second database; and the control means determining the recognized speech by correcting the word string on the basis of the corrected word-connection-information.

2. The speech recognition apparatus according to claim 1, wherein the word-connection-information is stored in a word-connection-information storage section as a graph structure expressed by nodes and arcs.

3. The speech recognition apparatus according to claim 1, wherein the word-connection-information includes a starting time and an ending time for each word in the word string.

4. The speech recognition apparatus according to claim 1, wherein the matching means forms the word string by connecting words from the selected words as their acoustic and linguistic scores are calculated; and each time a word is connected to the word string, the word string is re-evaluated and the word-connection-information is corrected.

5. The speech recognition apparatus according to claim 1, wherein the preliminary word-selecting means selects words and the matching means forms the word string by referring to the word-connection-information.

6. A speech recognition method of recognizing an input speech as a recognized speech, comprising the steps of:

a feature extracting step of extracting feature amounts from the input speech;

a preliminary word-selecting step of selecting words on the basis of the feature amounts by referring to a first database;

a matching step of calculating acoustic and linguistic scores for the selected words and forming a word string serving as a candidate for the recognized speech by referring to a second database; wherein the second database incorporates more precise acoustic model, phoneme information, and grammar rules than the first database;

a control step of generating word-connection-information between words in the word string; the word-connection-information including acoustic and linguistic scores for each word in the word string;

a re-evaluation step of re-evaluating the word string and correcting the word-connection-information by referring to a third database; wherein the third database incorporates more precise acoustic models, phoneme information, and grammar rules than the second database; and a second control step of determining the recognized speech by correcting the word string on the basis of the corrected word-connection-information.

7. A recording medium for storing a program which executes on a computer for recognizing an input speech as a recognized speech, the program comprising:

a feature extracting step of extracting feature amounts from the input speech;

a preliminary word-selecting step of selecting words on the basis of the feature amounts by referring to a first database;

a matching step of calculating acoustic and linguistic scores for the selected words and forming a word string serving as a candidate for the recognized speech by referring to a second database; wherein the second database incorporates more precise acoustic model, phoneme information, and grammar rules than the first database;

a control step of generating word-connection-information between words in the word string; the word-connection-information including acoustic and linguistic scores for each word in the word string;

a re-evaluation step of re-evaluating the word string and correcting the word-connection-information by referring to a third database; wherein the third database incorporates more precise acoustic models, phoneme information, and grammar rules than the second database; and a second control step of determining the recognized speech by correcting the word string on the basis of the corrected word-connection-information.

* * * * *